P. J. LINNAHAN.
MICROMETER INDICATOR.
APPLICATION FILED APR. 9, 1910.

993,084.

Patented May 23, 1911.

Witnesses:
L. P. Weymouth
F. E. Fitzgerald

Inventor:
Peter J. Linnahan
By Henry J. Miller
atty.

UNITED STATES PATENT OFFICE.

PETER J. LINNAHAN, OF BEVERLY, MASSACHUSETTS.

MICROMETER-INDICATOR.

993,084.

Specification of Letters Patent. Patented May 23, 1911.

Application filed April 9, 1910. Serial No. 554,402.

*To all whom it may concern:*

Be it known that I, PETER J. LINNAHAN, of Beverly, in the county of Essex and State of Massachusetts, have invented certain new and useful Improvements in Micrometer-Indicators, of which the following is a specification, reference being had to the accompanying drawings, forming part thereof.

This invention has reference to improvements in micrometer indicators.

The object of the invention is to so construct a micrometer indicator that it may be utilized for universal micrometrical measurements and particularly to indicate the difference between a standard size or measurement and the size or measurement of an article or part of an article.

Other objects of the invention will appear from the following description.

The invention consists in such peculiar features of construction and combination of parts as shall hereinafter be more fully described and pointed out in the claim.

Figure 3:
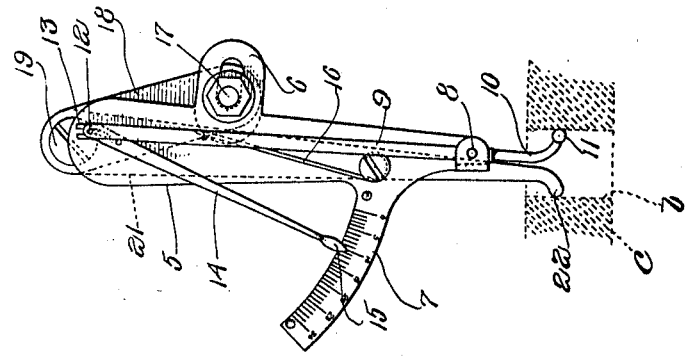
Figure 2:
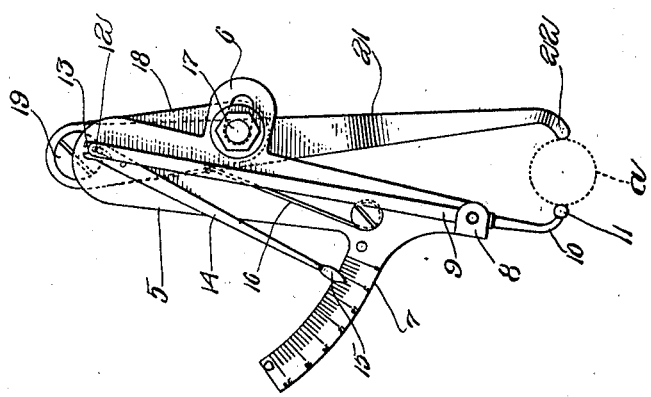
Figure 1:
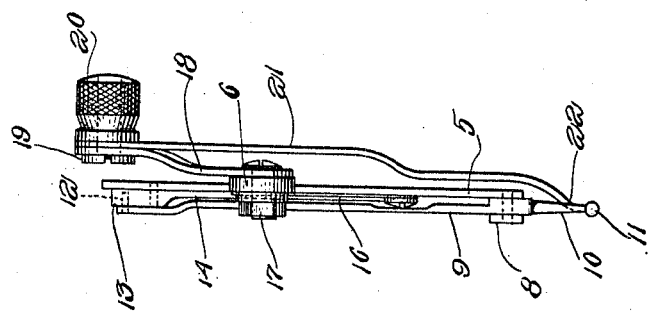

Figure 1, represents a side elevation of my improved micrometer indicator. Fig. 2, represents a front elevation of the improved micrometer indicator used as an outside caliper. Fig. 3, represents a similar view of the micrometer indicator used as an inside caliper.

Similar numbers of reference designate corresponding parts throughout.

As shown in the drawings, in its preferred form the plate 5 has the laterally extending arm 6 and the scale member 7 the scale of which is graduated micrometrically. At the end of said plate 5 nearest the scale member 7 the material is bent over to form the lip 8 in which, and the corresponding part of the blade 5, is supported the pivot for the feeler arm 9 which arm preferably has the curved end portion 10 furnished with the ball tip 11, while the other end of said feeler arm 9 has the pin 12 engaged in the slot 13 of the indicator needle 14 pivotally mounted on a pivot extending from the plate 5 and having the indicating end 15 which is free to traverse over the scale on the member 7. Spring 16 secured to the blade 5 and bearing against a pin, extending from the feeler arm 9, tends constantly to swing said feeler arm in a direction to effect the swinging of the needle 14 toward one end of the scale member 7.

Adjustably mounted in the arm 6 is the clamping screw 17 on which is pivotally secured the plate 18 whereby, when said clamping screw is loosened, said plate 18 may swing on said screw. At the outer end of plate 18 is mounted the screw 19 having the thumb nut clamp 20 and pivotally mounted on said screw 19 is the caliper arm 21 the lower end 22 of which is adapted to coöperate with the corresponding end of the feeler arm 9 to define a standard of measurement. This instrument is adapted to be used in a large variety of ways as an indicating micrometer, the arm 21 may be swung away from the end 10 of the feeler arm 9 sufficiently to permit the end 11 of the feeler to be passed over the surface of an article or the instrument may be used as shown in Figs. 2 and 3 of the drawings.

In Fig. 2 of the drawings the use of the instrument is illustrated as in taking the diameter of the article $a$ in comparison with a standard of measurement, in this case the ends 11 and 22 are brought together to the standard measurement and the nut 20 is tightened to hold arm 21 from swinging on its pivot, the indicator 14 pointing to zero when now the article to be tested is brought between said ends 11 and 22 any excess in diameter of said article $a$, above the standard, will force outward the end 11 of the feeler arm 9 whereby the indicator needle 14 will be caused to swing, proportionately, with relation to the scale marked on the member 7 whereby the excess of size will be indicated on the scale. If the article brought between the ends is smaller than the standard the indicator will not be moved, and the fact of its being smaller will be shown by its not touching both ends 11 and 22.

In the use of the instrument as an inside registering caliper, as shown in Fig. 3, the arm 21 is swung by the plate 5 until the ends 11 of the feeler 9 and 22 of said arm 21 extend in opposite directions and, after said ends have been adjusted to the standard of inside measurement, the nut 20 is tightened. When now the bore $b$ of the article $c$ is tested and said bore is found to be less than the standard of measurement the difference will be indicated on the scale of member 7 by the point 15 of the indicator 14.

The instrument may be used to test the accuracy of a taper and for many other measuring operations and the use of the instrument is facilitated by the use of the thumb nut 20 which may be utilized as a handle so located that the grasp of the user's fingers does not interfere with the swinging of the feeler arm 9 or the indicator needle 14. The plate 18 and the manner in which said plate is mounted permits of the adjustment of the axis on which the arm 21 swings relative to the end 11 of the feeler arm 9.

Having thus described my invention I claim as new and desire to secure by Letters Patent.

A micrometer indicator comprising a caliper arm having a curved free end, a link plate, a clamp having a thumb nut for securing said plate to said arm, a scale carrying member having an arm extending laterally therefrom at a point intermediate the ends of said scale carrying member, a clamp for securing said link plate to said lateral arm, a feeler pivotally mounted on said scale carrying member and having a curved end, and an indicator needle pivotally mounted on said scale carrying member and pivotally connected with said feeler substantially as described.

PETER J. LINNAHAN.

Witnesses:
H. J. MILLER,
F. E. FITZGERALD.